Figure 1:
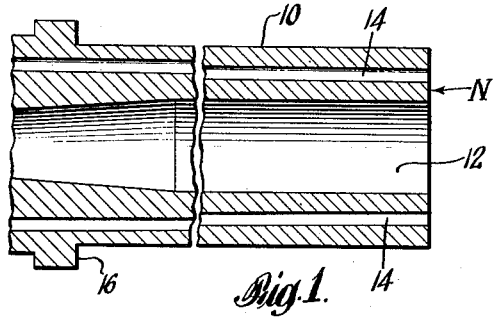

Sept. 4, 1945. P. R. ARONSON 2,383,949
METHOD OF MAKING BLOWPIPE NOZZLES
Filed Nov. 29, 1939

INVENTOR
PETER R. ARONSON
BY
ATTORNEY

Patented Sept. 4, 1945

2,383,949

UNITED STATES PATENT OFFICE 2,383,949

METHOD OF MAKING BLOWPIPE NOZZLES

Peter R. Aronson, Kenmore, N. Y., assignor to Union Carbide and Carbon Corporation, a corporation of New York Application November 29, 1939, Serial No. 306,596

8 Claims. (Cl. 29—157)

This invention relates to blowpipe nozzles, and particularly to new and improved single-piece blowpipe nozzles capable of delivering a closed ring or annular preheating flame, and to a method of making such nozzles. The invention has especial utility for the production of cutting and deseaming nozzles adapted to discharge one or more streams of oxygen to a cutting or a flame-machining zone.

In the art of metal cutting, deseaming, or flame-machining, by the oxy-acetylene process, it is often desirable to employ an annular preheating flame surrounding a jet of oxidizing gas being discharged from the blowpipe nozzle. Among the many advantages attributable to such an annular flame may be mentioned the following: the stability of the flame is increased; a constant preheat is supplied to the work irrespective of changes in the angular position of the nozzle about its longitudinal axis while following an irregular line in cutting irregular shapes by machines; a more rapid heat transfer to the work is secured, due to the increased effective area of the latter contacted by a ring flame; and protection of the oxygen jet by a continuous enclosing curtain of flame from objectionable dilution by the surrounding air.

Heretofore, multi-piece nozzles have been designed to produce ring-type flame preheating jets. However, the constructional difficulties encountered in accurately positioning and centering separate nozzle elements relative to each other at the discharge end of such a nozzle to form the extremely thin, accurate annular orific required for the usual type of flame-machining operation render it extremely difficult or impossible to produce by the usual machining operations successive nozzles which are identical to a degree such that they may be freely substituted for each other in a nozzle assembly or the like. Moreover, multipiece nozzles possess other disadvantages. Thus rapid deterioration of the nozzle occurs in use, due to inadequate heat transfer from the member exposed to the high temperature zone, which causes local overheating of the metal of that member. This appears to be due, at least in part, to the heat-insulating effect of thin layers of oxide that form at the joint between the assembled nozzle parts. Warping of the nozzle parts may occur when the nozzle is exposed to the heat present adjacent a cutting operation, thereby causing leakage of gas between the parts, with resultant contamination of the oxygen stream, and rendering the nozzle inefficient. Uncontrolled distortion of the gas passages also may occur at the forward end of the nozzle due to local overheating.

Among the more important objects of this invention are: to provide a novel method of making a blowpipe nozzle of simple, rugged, and inexpensive construction having an accurate annular or closed ring-type discharge orifice which overcomes the above and other difficulties.

Other objects of the invention include the provision of a method of making a nozzle, having an annular orifice at its gas-discharge end which will produce an accurate ring-type flame throughout the life of the nozzle; the provision of such a nozzle formed from a single piece of metal; and a novel method of making such nozzles involving a cold-working technique.

Figure 2:
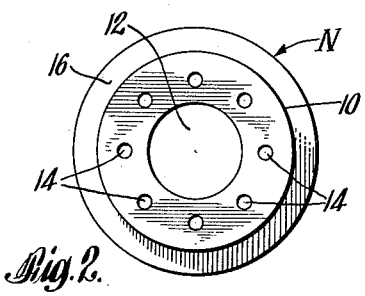
Figure 3:
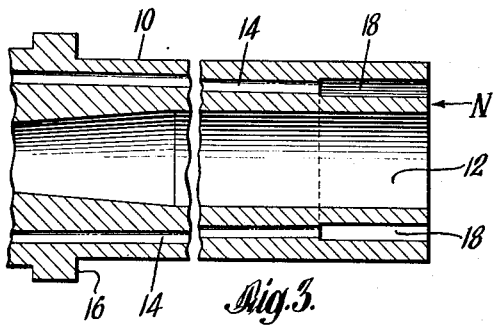
Figure 4:
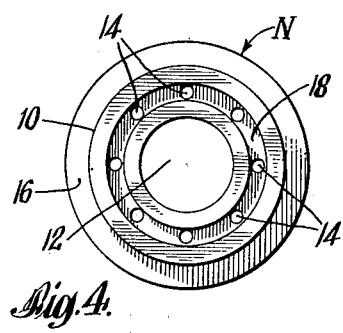
Figure 5:
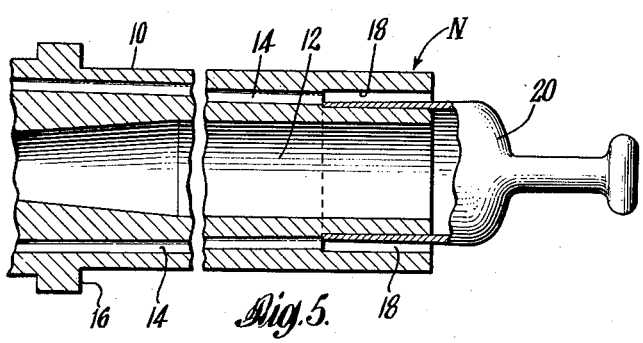
Figure 6:
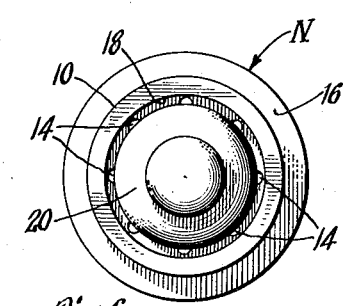
Figure 7:
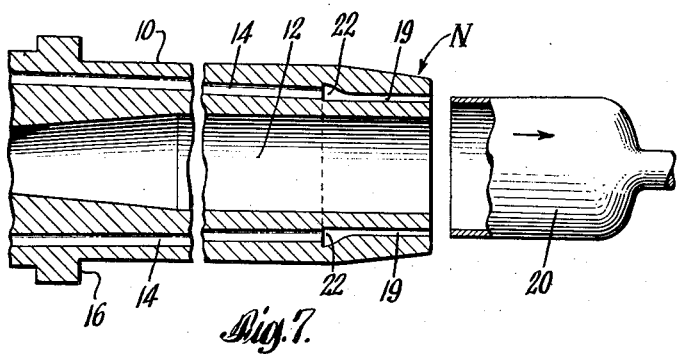
Figure 8:
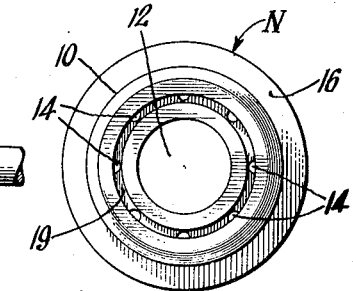

The above and other objects of the invention will become apparent from the following specification and drawing, in which:

Figs. 1 and 2 are, respectively, a longitudinal section, parts being broken away, and an end view, of one form of standard drilled or swaged nozzle to which the principles of this invention may be applied;

Figs. 3 and 4, respectively, are a longitudinal sectional view, parts being broken away, and an end view, of the nozzle at an intermediate stage of the process;

Figs. 5 and 6, respectively, are a longitudinal section, parts being broken away, and an end view, of the nozzle with the tubular mandrel in place, prior to a swaging operation; and Figs. 7 and 8, respectively, are a longitudinal section, parts being broken away, and an end view, of a completed nozzle.

Referring to Fig. 1, the nozzle N comprises a substantially cylindrical body 10 of a ductile metal such as copper, provided with a main axial gas passage 12 and a series of uniformly spaced passages 14 respectively equidistant from the passage 12, and disposed between the latter and the outer periphery of the nozzle. The rear or inlet end of the nozzle body 10 is provided with a shoulder 16 adapted to cooperate with a nut associated with a blowpipe for coupling the nozzle to a blowpipe. The cross-sectional area of the passage 12 obviously depends upon the type of flame cutting or other work to be performed. The passages 14 usually are of relatively small cross-sectional area, and they may be parallel with or converging toward the main axial passage 12.

The nozzle N may be formed by accurately drilling the passages 12 and 14, or by swaging a ductile metal blank having rough oversize passages therein in which mandrels are held during the swaging process. One such swaging method is described and claimed in the copending application of P. R. Aronson, Serial No. 158,703, filed August 12, 1937.

In order to produce a ring-type flame of satisfactory characteristics, a nozzle having an extremely thin annular orifice of uniform width is required. Such nozzle cannot be formed by any practical procedure using machine cutting tools. If the thickness of the orifice were too great, and the torch is adjusted for the economical consumption of the preheat gas, the ring flame would be unstable and backfiring would occur. This deficiency can only be overcome by increasing the gas consumption, thus rendering the gas demands of the nozzle uneconomical; or by decreasing the thickness of the annular orifice to a point where normal gas consumption and pressure will provide a sufficiently high gas velocity to produce a stable flame.

Therefore, in accordance with the invention, as illustrated in Figs. 3 and 4, the nozzle N has formed therein at its discharge end, an oversize annular groove, recess or orifice 18 of substantial depth. The groove is concentric with the passage 12 and is in communication with each of the passages 14. The groove is of sufficient thickness that it can be readily machined, preferably using a milling tool commonly known as a "fly-cutter." The groove 18 includes the discharge orifices of the passages 14, and extends a substantial distance into the body 10.

The nozzle thus provided with the milled groove 18 is annealed to restore its ductility, and then is pickled and bright dipped to remove any oxide that may have formed on the nozzle during the annealing operation. A cup-shaped or tubular mandrel 20 then is positioned within the groove 18. The internal diameter of the mandrel is such as to provide a close sliding fit on the wall forming the inner surface of groove 18. The outer wall of the mandrel is provided with a slight draft or taper to insure easy withdrawal of the mandrel from the nozzle after the assembly has been subjected to a metal-working operation. The cup-shaped or tubular mandrel 20 is preferably made of spring-tempered steel; and it must be lubricated prior to its insertion in the groove 18. The thickness of the steel forming the mandrel determines the width of the annular passage in the finished nozzle.

The assembly of nozzle and mandrel then is fed into a swaging machine, thereby causing cold flow of the metal surrounding the mandrel into contact with the latter so that it will conform therewith. The cold-working should not be any greater than that sufficient to move the outside annular layer of metal into engagement with the outer wall of the mandrel 20, otherwise the mandrel may fail due to its extreme hardness and brittleness.

The assembly of nozzle N and the mandrel 20 is forced into the swaging machine a distance less than the depth of the groove 18. Thus there is formed an annular gas-distributing chamber 22 (see Fig. 7) between the ends of the passages 14 and the beginning of an annular passage 19 of reduced cross-section. The construction of the nozzle preferably is such that the cross-sectional area of at least that portion of passage 19 adjacent the discharge end of the nozzle is substantially less than the sum of the cross-sectional areas of said passages 14, whereas the cross-sectional area of the portion of the groove 18 forming the chamber 22 adjacent the gas passages 14 is greater than the sum of the cross-sectional areas of said passages 14. The chamber 22 is of sufficient size to receive the gas from passages 14 and to distribute it uniformly about the periphery of the discharge orifice or passage 19 without interfering with the streamline flow of the gas within the passage 19.

The nozzles of the present invention have annular outlet orifices sufficiently thin to provide adequate gas velocities insuring a steady flame with an efficient utilization of the gas. The annular or ring-type flames thus produced afford a very rapid and uniform transfer of the heat to the work, while preventing or inhibiting the dilution or contamination of the cutting oxygen with air from the surrounding atmosphere.

Upon removal of the mandrel 20, the finished nozzle then may be machined to length, as by facing off the end at the swaged zone, and is then ready for use. It may be annealed, pickled and bright dipped prior to or after the facing operation.

While the various features of the improved nozzle and the novel method of making it have been illustrated in connection with the production of a nozzle designed for use in a cutting operation, it will be evident that the invention is of wide application; and that numerous details and features may be used without others, without departing from the principles of the invention. Thus the central oxygen passage 12 may be omitted to provide a heating nozzle instead of a cutting or deseaming nozzle. A combustible gas, such as a mixture of oxygen and acetylene, may be supplied to the inlets of the passages 14 in a well-known manner, as through appropriate passages in a blowpipe head to which the improved nozzle may be coupled in the usual or any preferred way.

The use of a mandrel having a slight taper may have the advantage that the resulting annular outlet passage will converge slightly to concentrate the flame closer to the line of heating or cutting.

The invention is susceptible of modification within the scope of the appended claims.

I claim:

1. A method of making from a single piece of ductile metal a unitary blowpipe nozzle having an annular discharge orifice, which comprises, forming a series of gass passages within a body of ductile metal, said passages being disposed in an annular zone about the longitudinal central axis of said body; forming an annular groove of substantial depth within the discharge end of said body, said annular groove being in communication with each of said gas passages and being of sufficient diameter and thickness to include said gas passages; inserting into said annular groove a tubular mandrel of less thickness than said groove; and cold-working the discharge end of said ductile metal body while the latter houses said mandrel, so as to force the outer wall of the groove into continuous contact with the outer surface of the mandrel and to reduce the thickness of said groove to that of the wall of said tubular mandrel, and thereafter removing the mandrel from said groove.

2. A method as claimed in claim 1, which includes forming an additional longitudinal gas passage in said body, the last-named gas passage being surrounded by said groove at the discharge end of the body and extending throughout the length of said body.

3. A method of making a blowpipe nozzle as claimed in claim 1, wherein the discharge end of said nozzle is cold-worked by subjecting to a swaging operation a portion thereof at the discharge end of said body of substantially less length than the depth of said annular groove and lying between the mandrel and the outer margin of the metal body, while the groove houses said mandrel, so as to force the outer wall of the groove into continuous contact with the outer surface of the mandrel, whereby the bottom of said annular groove forms an annular gas-distributing chamber between said passages and said annular orifice.

4. A method of making a unitary blowpipe nozzle having an annular discharge orifice, which comprises, forming in a ductile metal body a central longitudinally extending gas passage and a plurality of longitudinally extending gas passages disposed around and concentrically with respect to said central passage; forming an oversize annular groove of substantial depth in the discharge end of said body, said groove being of greater width than said gas passages and of sufficient diameter and thickness to communicate with said concentrically disposed gas passages; inserting a tubular mandrel of thin metal into said annular groove, the internal wall of said mandrel slidingly fitting the inner wall of said groove, and the outer wall of said mandrel having a draft to facilitate its removal after the assembly has been subjected to a metal-working operation; and swaging a portion of the discharge end of said nozzle to reduce the thickness of the groove while the latter houses said mandrel, the length of said swaged portion being substantially less than the depth of said annular groove, so as to force the outer wall of the groove into continuous contact with the outer surface of the mandrel and to form a nozzle having a narrow annular discharge orifice and having a gas-distributing chamber connecting said annular orifice and said concentrically disposed gas passages, and thereafter removing the mandrel from said groove.

5. A method of making a unitary blowpipe nozzle having an annular discharge orifice, which comprises, forming a plurality of laterally-spaced gas passages longitudinally within a body of ductile metal; forming an annular groove of substantial depth in the discharge end of said body, said annular groove being in communication with each of said gas passages; inserting into said groove an annular mandrel of less wall thickness than the width of said groove, and having an inner diameter approximately corresponding to the inner diameter of said groove; and pressure-working the discharge end of said ductile metal body with said mandrel in the groove, so as to force the outer wall of the groove into continuous contact with the outer surface of the mandrel and to reduce the width of said groove at said discharge end to substantially the thickness of the wall of said tubular mandrel, and thereafter removing the mandrel from said groove.

6. A method of making a unitary blowpipe nozzle having an annular discharge orifice, which comprises, forming a central longitudinal passage within a tubular body of ductile metal, and a plurality of laterally-spaced gas passages disposed longitudinally of said body of metal and surrounding said central passage; forming an annular groove of substantial depth in the discharge end of said body, said annular groove being in communication with each of said plurality of gas passages; inserting into said groove an annular mandrel having a wall thickness less than the width of said groove and having an inner diameter approximately corresponding to the inner diameter of said groove; while said mandrel is in said groove, cold-working that portion of the discharge end of said ductile metal body lying between the mandrel and the outer margin of the metal body, so as to force the outer wall of the groove into continuous contact with the outer surface of the mandrel and to reduce the width of said groove to the thickness of the wall of said tubular mandrel, and thereafter removing the mandrel from said groove.

7. A method of making a unitary blowpipe nozzle having an annular discharge orifice, which comprises, forming a plurality of laterally-spaced gas passages longitudinally within a body of ductile metal; forming an oversize annular groove of substantial depth in the discharge end of said body, said annular groove being in communication with each of said gas passages; inserting into said groove an annular mandrel having a wall thickness less than the width of said groove and having an inner diameter approximately corresponding to the inner diameter of said groove; and, while said mandrel is in the groove, swaging the discharge end of said ductile metal body, so as to reduce the width of said groove to the thickness of the wall of said tubular mandrel, and thereafter removing the mandrel from said groove.

8. A method of making a unitary blowpipe nozzle having an annular discharge orifice, which comprises, forming in a ductile metal body a central longitudinal gas passage and a plurality of laterally-spaced longitudinal gas passages disposed around said central passage; forming an oversize annular groove of substantial depth in the discharge end of said body, said groove being of greater width than said laterally-spaced gas passages and in communication with the latter; inserting a thin annular mandrel into said annular groove, said mandrel having a wall thickness less than the width of said groove, an inner diameter approximately corresponding to the inner diameter of said groove, and an outer diameter less than the outer diameter of the groove; and, while said mandrel is in the groove, swaging the discharge end of said ductile metal body so as to force the outer wall of the groove into continuous contact with the outer surface of the mandrel, the length of said swaged portion being substantially less than the depth of said annular groove, whereby a nozzle is formed having a narrow annular discharge orifice having a cross-sectional area substantially less than the sum of the cross-sectional areas of said laterally-spaced gas passages, and having a gas-distributing chamber connecting said annular orifice and said laterally-spaced gas passages, and thereafter removing the mandrel from said groove.

PETER R. ARONSON.